(12) United States Patent
Nonaka et al.

(10) Patent No.: US 8,760,552 B2
(45) Date of Patent: Jun. 24, 2014

(54) SHOOTING APPARATUS

(75) Inventors: Osamu Nonaka, Sagamihara (JP); Yoji Watanabe, Fuchu (JP)

(73) Assignee: Olympus Imaging Corp. (JP)

( * ) Notice: Subject to any disclaimer, the term of this patent is extended or adjusted under 35 U.S.C. 154(b) by 270 days.

(21) Appl. No.: 13/040,993

(22) Filed: Mar. 4, 2011

(65) Prior Publication Data

US 2011/0221949 A1 Sep. 15, 2011

(30) Foreign Application Priority Data

Mar. 10, 2010 (JP) ................................ 2010-053553

(51) Int. Cl.
*H04N 5/222* (2006.01)
(52) U.S. Cl.
USPC .................................................... 348/333.02
(58) Field of Classification Search
USPC ................. 348/169, 333.01, 333.02, 333.03, 348/231.99, 231.2, 231.4, 231.9
See application file for complete search history.

(56) References Cited

U.S. PATENT DOCUMENTS

| | | | | |
|---|---|---|---|---|
| 5,867,628 A | * | 2/1999 | Sato et al. ..................... | 386/225 |
| 5,982,981 A | * | 11/1999 | Satoh ........................... | 386/292 |
| 8,237,807 B2 | * | 8/2012 | Jones et al. ................. | 348/221.1 |
| 2010/0254543 A1 | * | 10/2010 | Kjolerbakken ................ | 381/92 |
| 2012/0182429 A1 | * | 7/2012 | Forutanpour et al. ......... | 348/175 |

FOREIGN PATENT DOCUMENTS

| | | |
|---|---|---|
| JP | 6343137 A | 12/1994 |
| JP | 2000-347322 A | 12/2000 |
| JP | 2003204513 A | 7/2003 |
| JP | 2008-271157 A | 11/2008 |

OTHER PUBLICATIONS

Office Action issued in corresponding Japanese Patent Application No. 2010-053553 dated Dec. 17, 2013 consisting of 4 pp. (English translation provided).

* cited by examiner

*Primary Examiner* — Lin Ye
*Assistant Examiner* — Chriss Yoder, III
(74) *Attorney, Agent, or Firm* — Volpe and Koenig, P.C.

(57) ABSTRACT

A shooting apparatus includes a camera main body, a determination unit, a display, a display controller, a touch panel. The camera main body is connectable with an independent recorder including a sound collecting range of collecting a sound. The determination unit determines whether or not the recorder is connected. The display controller displays an operation information for operating the recorder in accordance with the determined result by the determination unit, and if the recorder is connected, displays the sound collecting range of the recorder in a state that the range is overlapped on the image on the display. The touch panel receives an operation according to the operation information displayed on the display, and sends an operation instruction corresponding to the operation to the recorder.

12 Claims, 5 Drawing Sheets

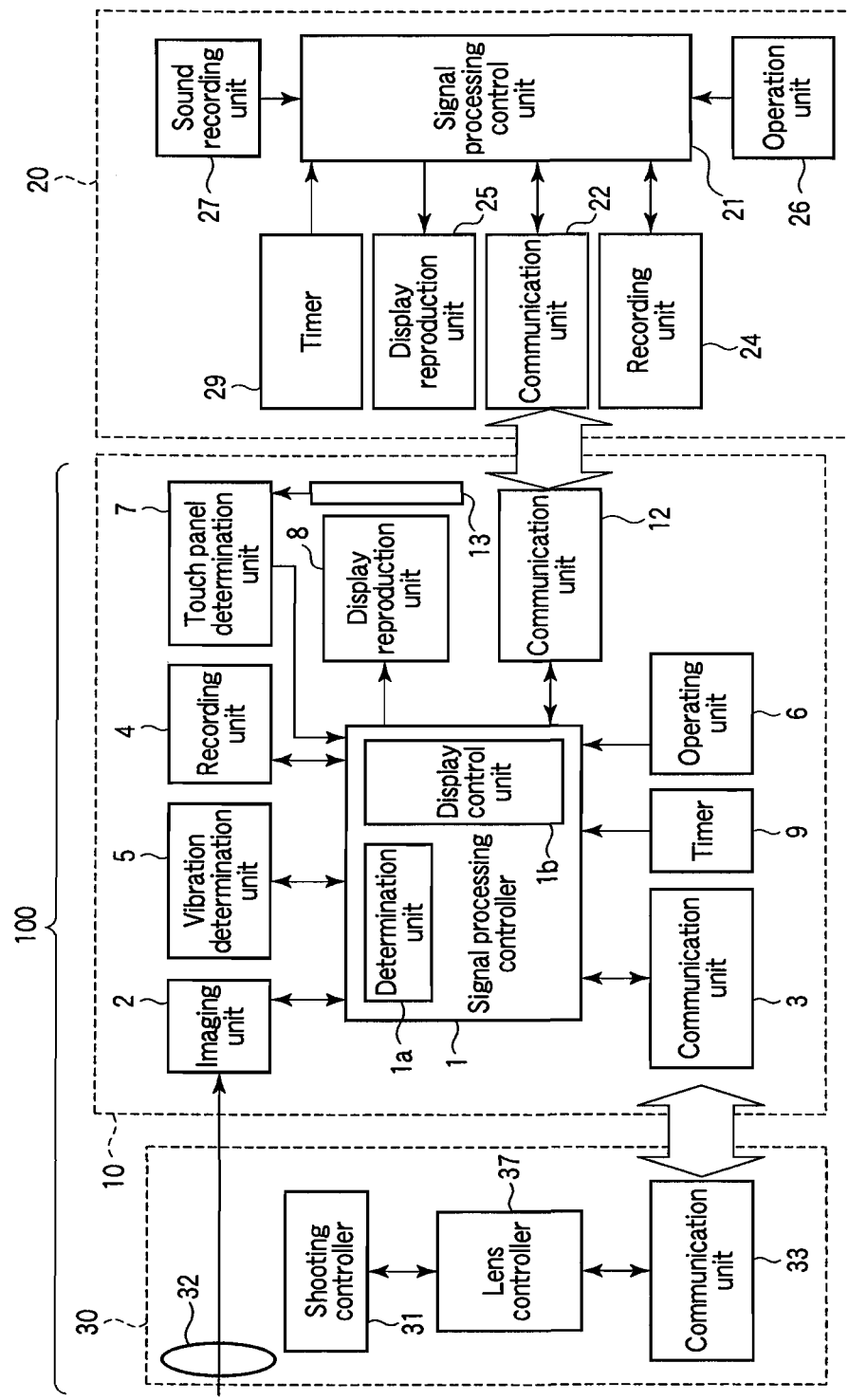
F I G. 1

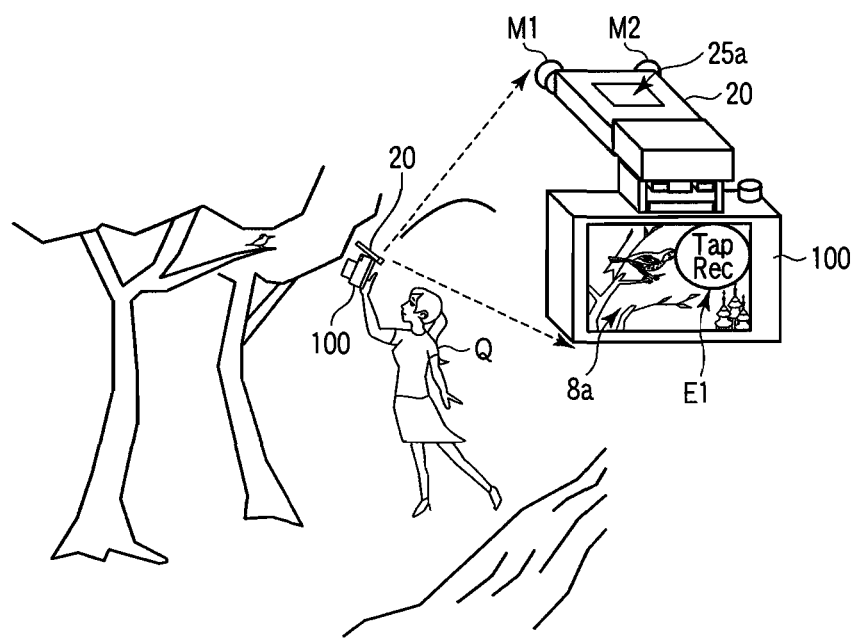
F I G. 2
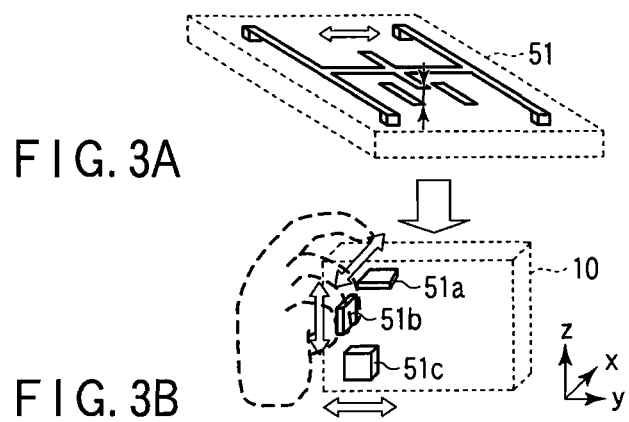
F I G. 3A
F I G. 3B

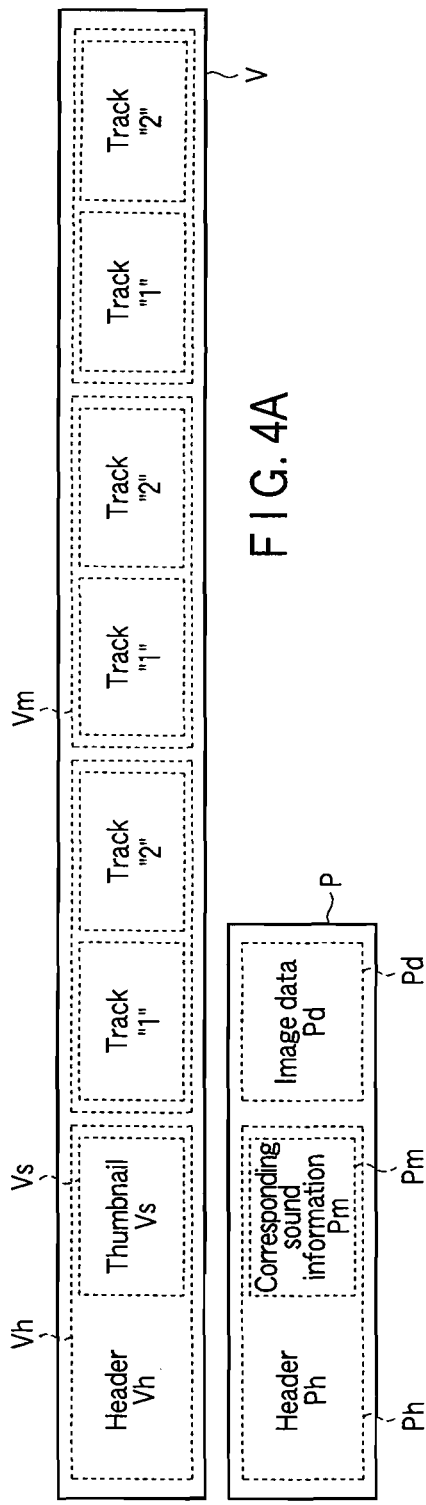
FIG. 4A
FIG. 4B
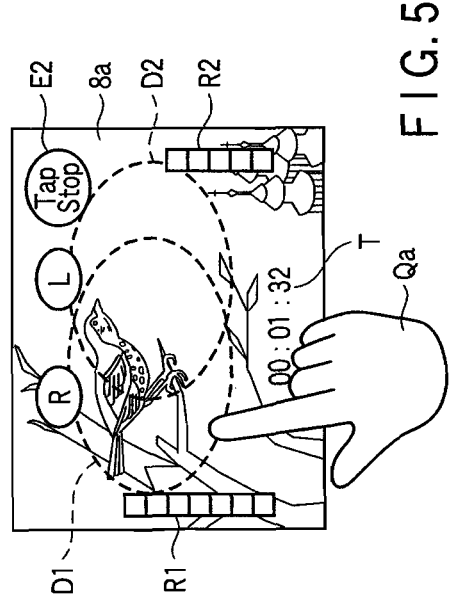
FIG. 5

SHOOTING APPARATUS

CROSS-REFERENCE TO RELATED APPLICATIONS

This application is based upon and claims the benefit of priority from prior Japanese Patent Application No. 2010-053553, filed Mar. 10, 2010, the entire contents of which are incorporated herein by reference.

BACKGROUND OF THE INVENTION

1. Field of the Invention

The present invention relates to a shooting apparatus such as a digital camera, which is connectable with an independent recorder.

2. Description of the Related Art

In a shooting apparatus, a method of recording sound has been variously proposed from the generation of a film camera. Since image and sound are each digitized so that they are recorded, it is easy to record the image and sound, which are associated with each other. Standardization of making an exchange of digital information between digital apparatuses, and requiring compatibility between them is popularly advanced. For example, Japanese Patent No. 3581144 relates to a system, which makes a connection between a camera and a voice recorder, and stores an image data and a sound data so that their data are associated with each other. Further, the foregoing U.S. Pat. No. 3,581,144 discloses the following technique of using a camera as the main body, and giving instructions to start and stop recording to a voice recorder in association with a shooting operation of the camera. Moreover, Jpn. Pat. Appln. KOKAI Publication No. 6-343137 relates to a system, which is able to connect two video cameras by means of a multi-connector, and discloses the following technique that one video camera simply functions as a VTR deck. Moreover, Jpn. Pat. Appln. KOKAI Publication No. 2000-347322 discloses data association.

BRIEF SUMMARY OF THE INVENTION

A shooting apparatus according to aspect of the present invention comprises a camera main body which is connectable with an independent recorder including a sound collecting range of collecting a sound, a determination unit which determines whether or not the recorder is connected, a display which displays an image, a display controller which displays an operation information for operating the recorder in accordance with the determined result by the determination unit and if the recorder is connected, displays the sound collecting range of the recorder in a state that the range is overlapped on the image on the display, and a touch panel which receives an operation according to the operation information displayed on the display and sends an operation instruction corresponding to the operation to the recorder.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a shooting apparatus according to one embodiment of the present invention;

FIG. 2 is a view showing a using state by user and an appearance;

FIG. 3A is a view showing the structure of a vibration determination unit of an shooting apparatus;

FIG. 3B is a view to explain a detection operation of each chip device forming the vibration determination unit of an shooting apparatus;

FIG. 4A is a view schematically showing a sound file format recorded in an IC recorder connected to a shooting apparatus;

FIG. 4B is a view schematically showing an image file format recorded in a shooting apparatus;

FIG. 5 is a view showing one example of operation information of a shooting apparatus;

DETAILED DESCRIPTION OF THE INVENTION

Figure 6:
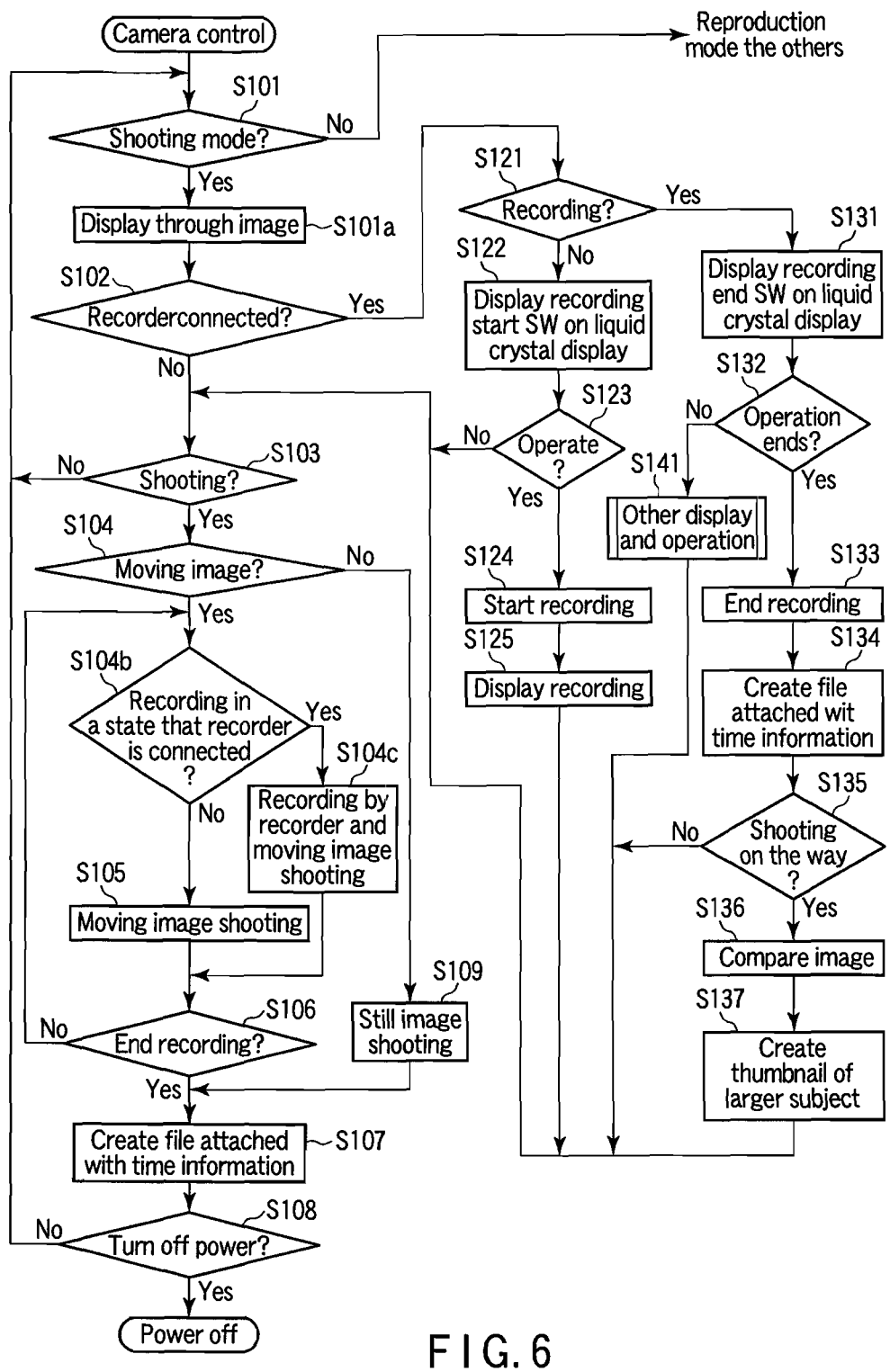
FIG. 6 is a flowchart to explain an operation control in a shooting apparatus.

One embodiment of the present invention will be hereinafter described with reference to the accompanying drawings.

FIG. 1 is a block diagram showing the configuration of a shooting apparatus (camera) 100. FIG. 2 is a view showing a using state by a user Q of a camera 100 and an appearance. The camera 100 is connectable with a sound recorder (IC recorder) 20. The IC recorder 20 is independent from the camera 100. The IC recorder 20 has a USB terminal, and makes a data exchange with the camera 100 by means of the USB terminal.

The foregoing camera 100 is a lens interchangeable type, and includes a camera main body 10 and an interchangeable lens 30. The interchangeable lens 30 is removable from the camera main body 10. The camera 100 may not necessarily a lens interchangeable type. The camera main body 10 is provided with a display screen 8a such as a liquid crystal display.

The IC recorder 20 is connectable to and removable from the camera main body 10 of the camera 100. For example, the IC recorder 20 includes two microphones M1, M2 capable of performing recording by a stereo, and a display screen 25a such as a liquid crystal display. Each of the foregoing microphones M1 and M2 are attached to the main body of the IC recorder 20 so that they are freely moved. Moreover, each of microphones M1 and M2 are able to vary the directivity (stereo sound collecting range) of collecting a sound of a recording target. Therefore, the IC recorder 20 is able to vary a stereo sound collecting range, that is, a recording range. The foregoing display screen 25a displays information for confirming an operating state in recording of the IC recorder 20, for example.

The foregoing interchangeable lens 30 includes an imaging lens 32, a shooting controller 31, a lens controller 37 and a communication unit 33. The imaging lens 32 is configured so that a light flux (image information) from a subject is incident on the imaging unit 2 included in the camera main body 10. The shooting controller 31 controls a shooting aperture. The lens controller 37 executes a lens control of the imaging lens 32, such as focusing control and zooming control in accordance with a lens control signal from the camera main body 10. The communication unit 33 functions as an interface for performing a communication of the lens controller 37 with the camera main body 10.

The camera body 10 includes a signal processing controller 1, an imaging unit 2, a communication unit 3, a recording unit 4, a vibration determination unit 5, an operation unit 6, a touch panel determination unit 7, a display reproduction unit 8, a timer 9, a communication unit 12 and a touch panel 13.

The imaging unit 2 photoelectrically converts a light flux incident through the imaging lens 32 to acquire an image data.

The display reproduction unit 8 includes a display unit such as a liquid crystal display and a sound reproduction unit such as a speaker. The display reproduction unit 8 displays various images such as a through image and a still image based on an image data obtained by the imaging unit 2. Further, the unit 8 reproduces a sound sent from the IC recorder 20 by means of a speaker.

The recording unit 4 records various data such as an image file, which is image by the imaging unit 2 and processed by the signal processing unit 1. For example, the recording unit is a flash memory.

The vibration determination unit 5 detects various motions such as tap or shakes by the user Q with respect to the camera main body 10. For example, an acceleration sensor is used as the foregoing vibration determination unit 5. Moreover, the unit 5 is configured in such a manner that a plurality of vibration detecting chip devices 51 shown in FIG. 3A is arranged. These chip devices 51 are formed using a microelectromechanical system (MEMS) process. Namely, a position between a cross-linked metal portion and a metal portion on the chip surface of the chip device 51 is changed according to acceleration. For example, if receiving various motions such as tap or shakes, each chip device 51 detects acceleration in the following manner that the distance between electrodes changes according to acceleration so that a capacitor component is changed. Specifically, each chip device 51 includes three chip devices 51a, 51b and 51c shown in FIG. 3B, which is provided in the camera main body 10. In this way, each chip device 51 detects various motions of three directions, that is, x, y and z directions (i.e., rear and front, right and left, up and down).

The operation unit 6 is various operation members for giving various operation instructions to the camera main body 10 by the user Q.

The timer 9 counts various times such as shot time (date and time).

The touch panel 13 is arranged on the display screen 8a such as a liquid crystal display of the display reproduction unit 8. The touch panel 13 outputs a touch position signal corresponding to a touch position by the user Q. If receiving a drag operation by the user Q, the touch panel 13 outputs a touch position signal corresponding to the touch position moved by the foregoing drag operation.

If receiving a touch position signal from the touch panel 13, the touch panel determination unit 7 determines that the touch panel 13 is touched, and thereafter, sends the touch position information to the display controller 1a of the signal processing controller 1.

The signal processing controller 1 controls the operation of each block of the camera main body 10. The signal processing controller 1 executes various image processings such as compression with respect to an image data obtained by the imaging unit 2. If receiving an operation of the operation unit 6, the controller 1 executes various processings in accordance with the operation content of the operation unit 6.

The communication unit 3 functions as an interface for performing a communication of the signal processing controller 1 with the interchangeable lens 30. Further, the communication unit 3 functions as an interface for performing a communication of the signal processing controller 1 with the IC recorder 20.

The IC recorder 20 includes a signal processing controller 21, a communication unit 22, a recording unit 24, a display reproduction unit 25, an operation unit 26, a sound recording unit 27 and a timer 29.

The recording unit 24 records various data such as a sound file, which is obtained by the sound recording unit 27 and processed by the signal processing controller 21. For example, the recording unit 24 is a flash memory.

The display reproduction unit 25 includes a speaker and a display unit. The display reproduction unit 25 converts a sound file recorded in the recording unit 24 into a sound by means of the speaker, and then, reproduces the sound. Further, the unit 25 displays various images on the display screen 25a such as a liquid crystal display.

The operation unit 26 includes various operation members for giving various operation instructions to the IC recorder 20 by the user Q.

The sound recording unit 27 includes microphones M1 and M2. The sound recording unit 27 converts a sound of an externally input recording target into an electric signal to acquire a sound data.

The timer 29 counts various times such as shot time (date and time).

The signal processing controller 21 executes the operation control of each block of the IC recorder 20. The signal processing controller 21 executes a processing such as compression with respect to a sound data obtained by the sound recording unit 27. If receiving an operation instruction by means of the operation unit 26 and if receiving an operation signal by means of the communication unit 22, the controller 21 executes various processings in accordance with the foregoing operation instructions.

The communication unit 22 functions as an interface for performing a communication between the signal processing controller 21 of the IC recorder 20 and the signal processing controller 1 of the camera main body 10. Namely, a communication is possible between the IC recorder 20 and the camera main body 10 by means of the communication unit 22 of the IC recorder 20 and the communication unit 12 of the camera main body 10. In a state that a communication is possible between the IC recorder 20 and the camera main body 10, the camera main body 10 receives a sound data from the IC recorder 20, and then, is able to record the sound data.

FIG. 4A is a view schematically showing a format of a sound file V recorded in the recording unit 24 of the IC recorder 20. The foregoing sound file V includes a plurality of micro-divided sound data (divided sound data). The sound file V is called as a division recording mode format. The sound file V in a normal recording mode has a sound data Vm, and a header vh attached to the sound data Vm. The header Vh includes a recording time and a thumbnail image Vs as a still image showing an association with an image data. The thumbnail image Vs is selected from a plurality of image data acquired by shooting during recording. An image data selected as the thumbnail image Vs is an image data if the size of a main subject is shot in the largest state.

The sound data Vm is recorded in a state that a sound data is divided into a plurality of tracks in time series. Each of the foregoing tracks records a divided sound data dividing a time-series sound data. Each track is recorded as track "1" and "2" every predetermined time (second). For example, track "1" is a sound data collected by means of microphone M1. Moreover, track "2" is a sound data collected by means of microphone M2. A divisional condition in a division recording mode is recorded in the header Vh.

FIG. 4B is a view schematically showing a format of an image file P recorded in the camera 100. The image file P includes a header Ph and an image data Pd. The header Ph records image data acquisition start time (shooting start time) and acquisition end time (shooting end time), and a corresponding sound information Pm related to one or more division sound data corresponding to an image data recorded in the image data Pd. For example, information showing header and end tracks of a division sound data corresponding to the image data is given as the foregoing corresponding sound information.

The signal processing controller 1 includes a determination unit 1a and a display control unit 1b. The determination unit 1a determines whether or not an IC recorder 20 is connected. The display control unit 1b displays operation information for operating the IC recorder 20 on the display screen 8a such as a liquid crystal display of the display reproduction unit 8 if the determination unit 1a determines that the IC recorder 20 is connected. Further, the foregoing unit 1b synthesizes the operation information on a through image acquired by shooting, and then, displays the synthesized information on the display screen 8a such as a liquid crystal display of the display reproduction unit 8.

The foregoing operation information relates to a sound of an imaging target. The operation information is an operation content such that the user Q is hard to operate on the display screen 25a of the IC recorder 20. Because the IC recorder 20 is attached to the camera 100 and the shooting range of the camera 100 must be aligned with the recording range (stereo sound collecting range) of the IC recorder. For example, the operation information includes a tap recording (Tap Rec) E1 shown in FIG. 2 for recommending recording by the IC recorder 20 and a tap recording end (Tap Stop) E2 shown in FIG. 5 for stopping to record. In FIG. 5, Qa denotes a touch by a finger of the user Q.

The operation information may be stereo sound collecting ranges D1 and D2 of microphones M1 and M2, recording gains R1 and R2 of microphones M1 and M2 and a recording time T. Moreover, the operation information may be an equalizer corresponding to sound data and a tone control thereto.

If receiving a touch position information from the touch panel determination unit 7, the display controller 1a sends instructions of an operation corresponding to the operation information such as tap recording E1, tap recording end E2, bar-shaped recording gains R1 ad R2 to the IC recorder 20.

The operation control of the camera 100 having the foregoing configuration will be described below with reference to an operation control flowchart shown in FIG. 6.

An operation mode of the camera 100 is set by an operation of the operation unit 6 by user. The signal processing controller 1 determines whether or not the operation mode is a shooting mode (S101). If the operation mode is a shooting mode, the signal processing controller 1 displays a through image on the display screen 8a of the display reproduction unit 8 (S101a).

The signal processing controller 1 determines whether or not the IC recorder 20 is connected. If the IC recorder 20 is not connected, the controller 1 determines whether or not a shooting start instruction is given by an operation of the operation unit 6 by user (S103). If the shooting start instruction is given, the controller 1 determines whether or not the user selects either of moving image shooting or still image shooting (S104). If the user selects the foregoing moving image shooting, the controller 1 determines whether or not the IC recorder 20 is connected and is executing recording (S104b).

If the IC recorder 20 is connected and is executing recording, the signal processing controller 1 gives recording instructions to the IC recorder 20 by means of the communication unit 12, and continuously operates the imaging unit 2 to execute moving image shooting for acquiring a moving image data (S104c).

Conversely, if the IC recorder 20 is not connected, the signal processing controller 1 continuously operates the imaging unit 2 to execute moving image shooting for acquiring a moving image data (S105). During moving image shooting, the controller 1 determines whether or not the user gives shooting end instructions by the operating the operation unit 6 (S106). If the shooting end instructions are not given, the controller 1 returns to step S105 to continue moving image shooting.

If the user selects still image shooting, the signal processing controller 1 transfers from step S104 to S109, and then, operates the imaging unit 2 to execute still image shooting for acquiring a still image data.

After the foregoing still image shooting or moving image shooting ends, the signal processing controller 1 creates an image file according to a format shown in FIG. 4A, and thereafter, records the created image file in the recording unit 4 (S107). If the IC recorder 20 is not connected, the header of the image file is recorded with information such as a shooting start time and a shooting end time, for example. The image file is created, and thereafter, the signal processing controller 1 determines whether or not the user gives instructions to turn off the power by operating the operation unit 6 (S108). If the foregoing instructions to turn off the power are given, the controller 1 ends the camera control. Conversely, if the instructions to turn off the power are given, the controller 1 turns to step S101.

Conversely, if the IC recorder 20 is connected, the signal processing controller 1 determines whether or not the IC recorder 20 is recording (S121). If the IC recorder 20 is not recording, the display control unit 1a synthesizes the tap recording E1 for recommending recording by the IC recorder 20 as operation information shown in FIG. 2 on a through image. Then, the control unit 1a displays the synthesized image on the display screen 8a such as a liquid crystal display (S122). The foregoing tap recording E1 is synthesized and displayed on a through image acquired by shooting.

If starting recording by the IC recorder 20, the user Q touches the tap recording E1, which is operation information on the display screen 8a such as a liquid crystal display. Then, the touch panel 13 outputs a touch position signal corresponding to the touch position by the user Q. If receiving the touch position signal from the touch panel 13, the touch panel determination unit 7 determines touch to the touch panel 13 (S123), and then, sends touch information to the display control unit 1a.

If receiving the touch position information from the touch panel determination unit 7, the display control unit 1a sends an operation instruction with respect to the operation information of the tap recording E1 to the IC recorder 20. If receiving a recording instruction from the display control unit 1a, the IC recorder 20 starts recording (S124). The signal processing controller 21 of the IC recorder 20 operates the sound recording unit 27 to acquire each sound data from microphones M1 and M2, and thus, executes recording. The display control unit 1a synthesizes recording, which is operation information on the display screen 8a such as a liquid crystal display on a through image, and then, displays it (S125).

If the IC recorder 20 is recording, the display control unit 1a transfers from step S121 to S131, and then, synthesizes the tap recording end E2 shown in FIG. 5 as operation information on a through image to display it on the display screen 8a such as a liquid crystal display (S131).

If ending recording by the IC recorder 20, the user Q touches the tap recording end E2, which is operation information. The display control unit 1a determines whether or not recording ends (S132). If recording ends, the control unit 1a sends a recording end instruction to the IC recorder 20. If receiving the recording end instruction from the display control unit 1a, the IC recorder 20 ends recording (S133).

The signal processing controller 21 of the IC recorder 20 records a sound file V in the recording unit 24 according to a format shown in FIG. 4A. A sound data Vm of the sound file V is divided into a plurality of tracks in which a sound data is recorded in time series. In this case, the sound data is recorded in a state of being divided into a track "1" of the sound data collected by microphone M1 every predetermined time (second) and a track "2" of the sound data collected by microphone M2 (S134).

The signal processing controller 21 determines whether or not shooting is carried out during recording (S135). If shooting is carried out, the controller 21 compares the size of each main subject in the image data (S136). The controller 21 selects an image data, which is the largest shot main subject in the image data, as a thumbnail image Vs (S137). The thumbnail image Vs is attached to a header Vh of the sound file V as seen from FIG. 4A.

Figure 7:
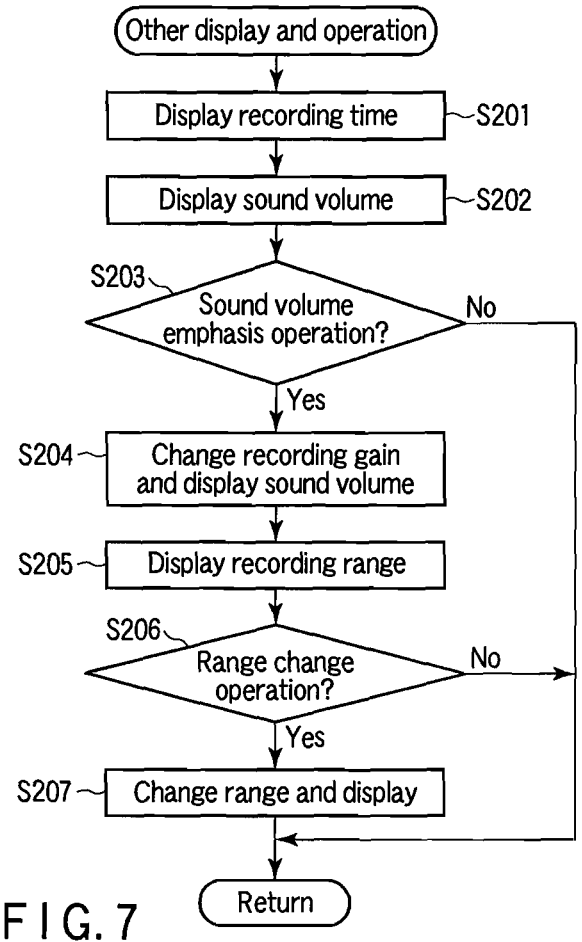
FIG. 7 is a flowchart to explain the a display operation of another operation information in a shooting apparatus.

The foregoing display control unit 1a determines whether or not recording ends; as a result, conversely, if recording does not end, the control unit 1a transfers from step S132 to S141 to execute a flowchart of a display operation of another operation information shown in FIG. 7. The control unit 1a synthesizes a recording time T as operation information shown in FIG. 5 on a through image, and then, displays it on the display screen 8a such as a liquid crystal display (S201). The control unit 1a synthesizes recording gains R1 and R2 of microphones M1 and M2 on a through image, and then, displays it on the display screen 8a (S202).

The display control unit 1a determines whether or not recording gains R1 and R2 on the display screen 8a is touched so that recording gain control is carried out (S203). For example, if the user Q touches recording gain R1 of recording gains R1 and R2 on the display screen 8a, the control unit 1a makes long the length of a bar of a bar-shaped recording gain R1 every user's touch. Further, the control unit 1a sends instructions to make large a recording gain to the IC recorder 20 (S204). If a recording gain reaches the maximum by receiving a plurality of touch times, the control unit 1a makes short the length of the bar of the bar-shaped recording gain R1 every if receiving touch, and then, sends instructions to reduce a recording gain to the IC recorder 20.

The display control unit 1a synthesizes each range of stereo sound collecting ranges D1 and D2 of microphones M1 and M2 on a through image, and then, displays it on the display screen (S205). The foregoing microphones M1 and M2 are each moved so that the position of stereo sound collecting ranges D1 and D2 is changed. The user Q touches stereo sound collecting ranges D1 and D2 on the display screen 8a, and then, moves the ranges by a drag operation (S206). In this case, the display control unit 1a changes the foregoing stereo sound collecting ranges D1 and D2 to a position moved by the drag operation (S207).

The operation if an independent IC recorder 20 is connected to a camera 100 will be described below with reference to FIG. 8.

For example, user has a desire for recording the twittering of a bird and shooting the bird in bird-watching. It is troublesome for a user Q to walk in a state of carrying both of a camera 100 and an IC recorder 20 in his hands. Namely, if the user Q has a camera 100 to watch a bird, the case where he is able not to operate the IC recorder 20 because his hands are not usable frequently occurs. Thus, the user Q connects the camera 100 with the IC recorder 20 so that they are integrated. Then, the user Q operates operation information displayed on a display screen 8a such as a liquid crystal display of the camera 100 to perform recording by the IC recorder 20 and shooting by the camera 100.

For example, under the condition shown in FIG. 2, the user Q operates the operation information such as tap recording E1 displayed on a display screen 8a such as a liquid crystal display. If the user Q hears the twittering of a bird, he sets the IC recorder 20 to a recording mode. On the other hand, if the user Q found a bird, he shoots the found bird by means of the camera 100.

Figure 8:
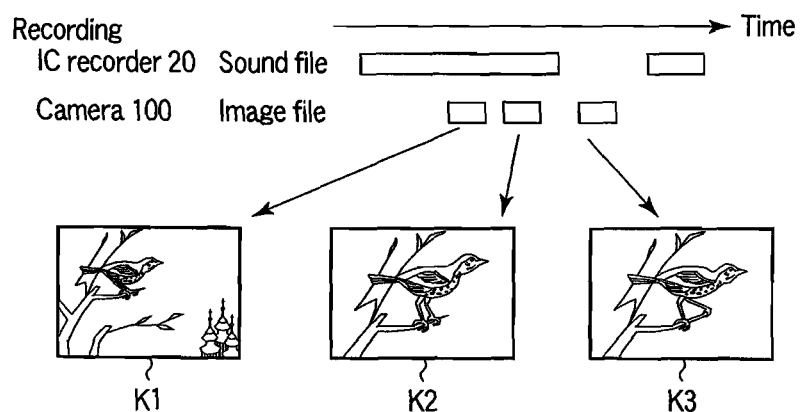
FIG. 8 is a view to explain one example of a using state when an independent IC recorder is connected to a shooting apparatus.

As shown in FIG. 8, recording and shooting timings according to the elapse of time will be described below. There is the case where user hears the twittering of a bird, and thereafter, starts recording. In this case, the user Q operates the tap recording E1 displayed on the display screen 8a such as a liquid crystal display of the camera 100, and then, finds a bird in a state of continuing the recording by the IC recorder 20. If the user Q the bird, he performs the shooting by the camera 100 to acquire an image data K1. The shooting by the camera 100 is carried out until a good composition of the bird to be shot is obtained, and thus, an image data K2 is acquired. If the user Q can not hear the twittering of a bird, he operates the tap recording end E2 displayed on the display screen 8a to interrupt the recording by the IC recorder 20. On the other hand, the shooting by the camera 100 is continued to acquire an image data K3. In this way, the user Q obtains the shooting of a satisfied composition of a bird, and thereafter, he again operates the tap recording E1 displayed on the display screen 8a such as a liquid crystal display of the camera 100, and then, records the twittering of the bird in the IC recorder 20.

As described above, according to the foregoing one embodiment, it is determined whether or not the IC recorder 20 is connected. If the IC recorder 20 is connected, operation information for operating the IC recorder 20 is displayed on the display screen 8a such as a liquid crystal display of the camera 100. Even if the IC recorder 20 is in a state of being attached to the camera 100, the user can operate the recording of a sound of a subject while operating the operation information of the IC recorder 20 displayed on the display reproduction unit 8 of the camera 100. Moreover, even if the IC recorder 20 is in a state of being attached to the camera 100, shooting by the camera 100 and recording by the IC recorder 20 are independently performed; therefore, this serves to improve the operability of the IC recorder 20.

As can be seen from FIG. 2, in a state that an independent IC recorder 20 is connected to a camera 100, there is the following problem in the usage. Namely, the size of the display screen 25a of the IC recorder 20 is small, and in addition, the direction of the display screen 25a is different from the eyes direction of the user Q. For this reason, it is hard to confirm the information of an operating state during recording of the IC recorder 20, which is displayed on the display screen 25a.

According to the foregoing camera 100, it is possible to easily confirm the operation content and the operating state of the IC recorder 20 by means of the operation information displayed on the display reproduction unit 8. Therefore, this serves to freely select the usage of the optimum shooting and sound recording in various scenes, and to record effective sound and image under various conditions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A shooting apparatus comprising:
    a camera main body which is connectable with an independent recorder including a sound collecting range of collecting a sound;
    a determination unit which determines whether or not the recorder is connected to the camera main body;
    a display which displays an image;
    a display controller which, if the recorder is connected to the camera main body as a result of determination by the determination unit, displays an operation information for operating the recorder, and displays the sound collecting range of the recorder in a state that the range is overlapped on the image on the display; and
    a touch panel which receives an operation according to the operation information displayed on the display and sends an operation instruction corresponding to the operation to the recorder;
    wherein the recorder stores a sound file, and
    the camera main body stores an image file comprising image data acquired by imaging and information corresponding to sound data in the sound file stored concurrently with the image data.

2. The apparatus according to claim 1, further comprising:
    an imaging unit which images an imaging target to acquire an image,
    the display controller synthesizing and displaying the operation information on the image acquired by shooting of the imaging unit.

3. The apparatus according to claim 1,
    wherein the operation information relates to a sound of an imaging target, and
    the display controller displays the operation information on the display.

4. The apparatus according to claim 1,
    wherein the display controller receives a touch operation including a drag operation with respect to the touch panel to change a position of the sound collecting range.

5. A shooting system comprising:
    a recorder including a sound collecting range of collecting a sound;
    a camera main body which is independent of and connectable with the recorder;
    a determination unit which determines whether or not the recorder is connected to the camera main body;
    a display which displays an image;
    a display controller which, if the recorder is connected to the camera main body as a result of determination by the determination unit, displays operation information for operating the recorder, and displays the sound collecting range of the recorder in a state that the range is overlapped on the image on the display; and
    a touch panel which receives an operation according to the operation information displayed on the display and sends an operation instruction corresponding to the operation to the recorder,
    wherein the recorder stores a sound file comprising a plurality of divided sound data and thumbnail data of image data stored concurrently with the divided sound data, and
    the camera main body stores an image file comprising image data acquired by imaging and information corresponding to sound data in the sound file stored concurrently with the image data.

6. The system according to claim 5, further comprising:
    an imaging unit which images an imaging target to acquire an image,
    the display controller synthesizing and displaying the operation information on the image acquired by shooting of the imaging unit.

7. The system according to claim 5, wherein the operation information relates to a sound of an imaging target, and the operation information is displayed on the display.

8. The system according to claim 5, wherein a position of the sound collecting range is changed upon receipt of a touch operation including a drag operation on the touch panel.

9. A shooting method in a shooting system comprising a recorder including a sound collecting range of collecting a sound and a camera main body which is connectable with the recorder, the method comprising:
    determining whether or not the recorder is connected to the camera main body;
    displaying, if the recorder is connected to the camera main body, operation information for operating the recorder, and the sound collecting range of the recorder in a state that the range is overlapped on an image on the display;
    receiving, by a touch panel, an operation according to the operation information displayed on the display; and
    sending an operation instruction corresponding to the operation to the recorder,
    wherein the recorder stores a sound file comprising a plurality of divided sound data and thumbnail data of image data stored concurrently with the divided sound data, and
    the camera main body stores an image file comprising image data acquired by imaging and information corresponding to sound data in the sound file stored concurrently with the image data.

10. The method according to claim 9, further comprising:
    imaging, by a camera main body, an imaging target to acquire an image, and
    synthesizing and displaying the operation information on the acquired image.

11. The method according to claim 9, wherein the operation information relates to a sound of an imaging target, and the operation information is displayed on the display.

12. The method according to claim 9, wherein a position of the sound collecting range is changed upon receipt of a touch operation including a drag operation on the touch panel.

* * * * *